(12) United States Patent
Nakamura et al.

(10) Patent No.: US 9,488,886 B2
(45) Date of Patent: Nov. 8, 2016

(54) DISPLAY UNIT AND ELECTRONIC APPARATUS

(71) Applicant: Sony Corporation, Tokyo (JP)

(72) Inventors: Hirofumi Nakamura, Kanagawa (JP); Shota Nishi, Kanagawa (JP); Yoichi Negoro, Kanagawa (JP); Hidehiko Takanashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 14/221,309

(22) Filed: Mar. 21, 2014

(65) Prior Publication Data

US 2014/0300850 A1   Oct. 9, 2014

(30) Foreign Application Priority Data

Apr. 5, 2013   (JP) ................. 2013-079318

(51) Int. Cl.
   *G02F 1/1343*   (2006.01)
   *G02F 1/1345*   (2006.01)
   *G02F 1/1333*   (2006.01)

(52) U.S. Cl.
   CPC ........... *G02F 1/13452* (2013.01); *G02F 2001/133302* (2013.01)

(58) Field of Classification Search
   CPC .................................................. G02F 1/13452
   See application file for complete search history.

(56) References Cited

U.S. PATENT DOCUMENTS

| | | |
|---|---|---|
| 8,553,317 B2 | 10/2013 | Yasui et al. |
| 8,908,258 B2 | 12/2014 | Kobayashi et al. |
| 2013/0050806 A1 | 2/2013 | Yasui et al. |
| 2013/0188113 A1* | 7/2013 | Isobe .................. G02F 1/1309 349/58 |
| 2013/0308175 A1 | 11/2013 | Yasui et al. |
| 2013/0321896 A1 | 12/2013 | Shuto et al. |
| 2013/0335810 A1 | 12/2013 | Kobayashi et al. |
| 2014/0002889 A1 | 1/2014 | Kaino et al. |
| 2014/0146383 A1 | 5/2014 | Yasui et al. |
| 2015/0124312 A1 | 5/2015 | Mitsugi et al. |
| 2015/0293425 A1 | 10/2015 | Kaino et al. |

FOREIGN PATENT DOCUMENTS

JP   2013-029722 A   2/2013

\* cited by examiner

*Primary Examiner* — Timothy L Rude
(74) *Attorney, Agent, or Firm* — Wolf, Greenfield & Sacks, P.C.

(57) ABSTRACT

A display unit includes: a base; a display layer having a first end surface; and a wiring layer disposed between the base and the display layer, the wiring layer being provided in a region differing from a position corresponding to the first end surface.

12 Claims, 16 Drawing Sheets

DISPLAY UNIT AND ELECTRONIC APPARATUS

CROSS REFERENCE TO RELATED APPLICATIONS

This application claims the benefit of Japanese Priority Patent Application JP2013-79318 filed Apr. 5, 2013, the entire contents of which are incorporated herein by reference.

BACKGROUND

The present technology relates to a display unit in which a display layer is provided on a base with a wiring layer in between, and to an electronic apparatus equipped with this display unit.

Currently, liquid crystal display units are being widely used as planar displays in televisions and other electronic apparatus. Further, display units that are capable of reducing their thickness and power consumption are attracting interest.

The applicant has already proposed a display unit as described above. Specifically, this display unit includes: a substrate that has a sealing region surrounding a display region and a step section surrounding the sealing region from outside; a display layer provided in the display region; and a sealing section provided in the sealing region (for example, refer to Japanese Unexamined Patent Application Publication No. 2013-029722 (JP 2013-029722A)). The display unit configured above allows the sealing region to be provided in a desired region because the step section is provided on the substrate. Therefore, the influence of the sealing section on a wiring part provided in a region other than the sealing region, such as the outer region of the substrate, is prevented. Moreover, the frame is allowed to be narrowed.

SUMMARY

In the display unit in JP 2013-029722A described above, the display layer is formed in the display region, and the wiring layer in which thin film transistors (TFTs), wires, and the like that selectively drive pixels in the display layer are formed extends from the display region to the sealing region. Such display units are typically manufactured through the following processes. First, a base, a wiring layer, a display layer, and the like are sequentially laminated on a glass substrate, so that a laminated body is formed. Thereafter, the laminated body is delaminated from the glass substrate, for example, using a roller. During this delamination operation, however, excessive stress may be applied to the wiring layer disposed under the display layer by an edge of the display layer. In this case, the wiring layer may be damaged. This damage may be more noticeable, for example, as the wiring layer becomes thinner.

It is desirable to provide a display unit that has superior mass productivity and a high operational reliability, and an electronic apparatus equipped with such a display unit.

A display according to an embodiment of the present disclosure includes: a base; a display layer having a first end surface; and a wiring layer disposed between the base and the display layer, the wiring layer being provided in a region differing from a position corresponding to the first end surface.

An electronic apparatus according to an embodiment of the present disclosure is provided with a display unit that includes: a base; a display layer having a first end surface; and a wiring layer disposed between the base and the display layer, the wiring layer being provided in a region differing from a position corresponding to the first end surface.

In the display unit and electronic apparatus according to the above-described embodiments of the present disclosure, a delamination process is allowed to be performed without causing an edge of the first end surface of the display layer to damage the wiring layer, during the manufacture.

According to the display unit and the electronic apparatus according to the above-described embodiments of the present disclosure, an occurrence factor in damaging the wiring layer during the manufacture is reduced. This makes it possible to achieve superior mass productivity, and to maintain functions of the wiring layer even if the wiring layer is made thinner. It is consequently possible to secure high reliability.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail with reference to the accompanying drawings. The description will be given in the following order.
1. First embodiment
 A display unit including a wiring layer that has an end surface at a position recessed with respect to a position of an end surface of a display layer
2. Second embodiment and modification thereof
 A display unit including a wiring layer that has an opening in a region corresponding to an end surface of a display layer
3. Exemplary applications First Embodiment Configuration of Display Unit 1

Figure 1:
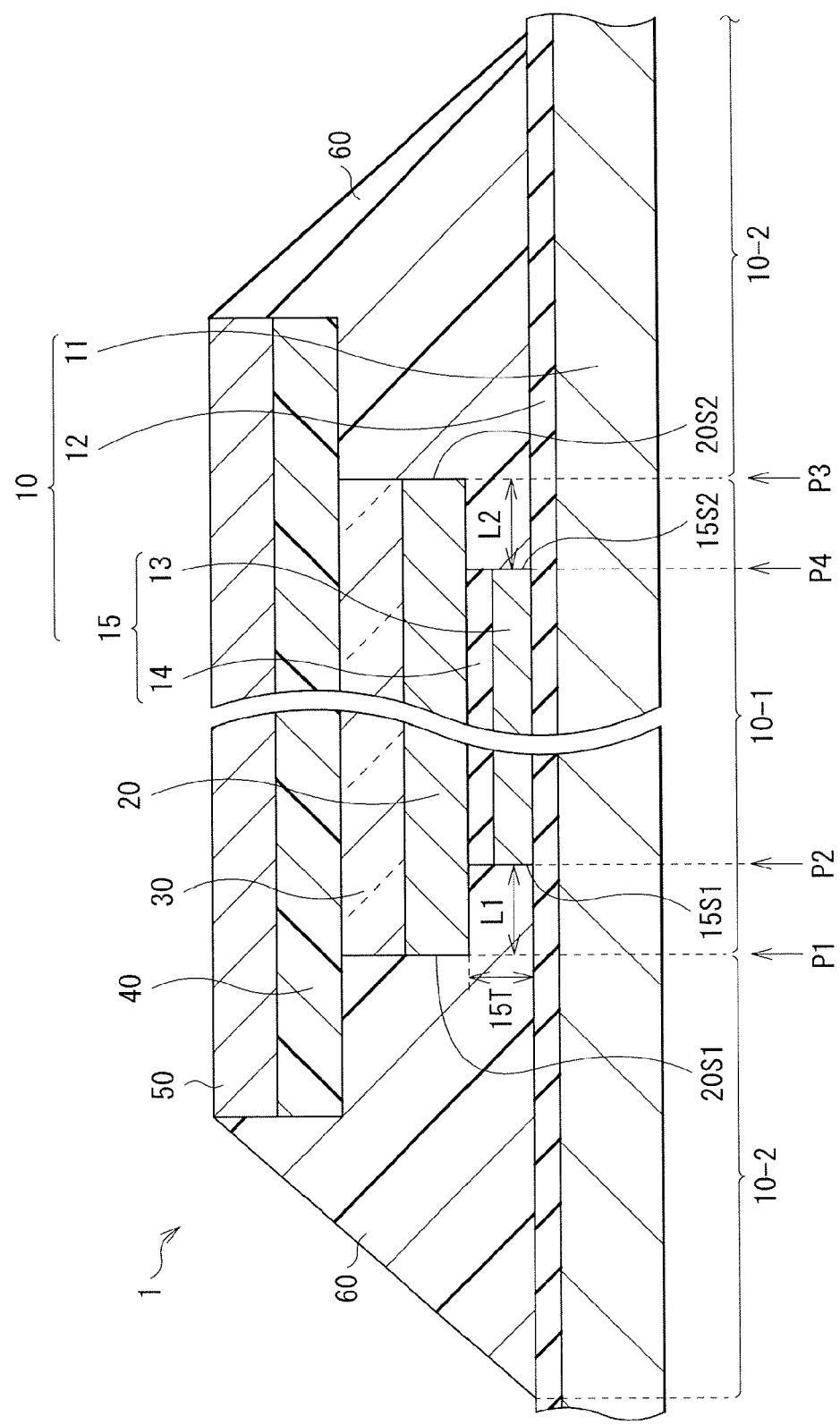
FIG. 1 is a cross-sectional view showing an exemplary configuration of a main section of a display unit according to a first embodiment of the present disclosure.
Figure 2:
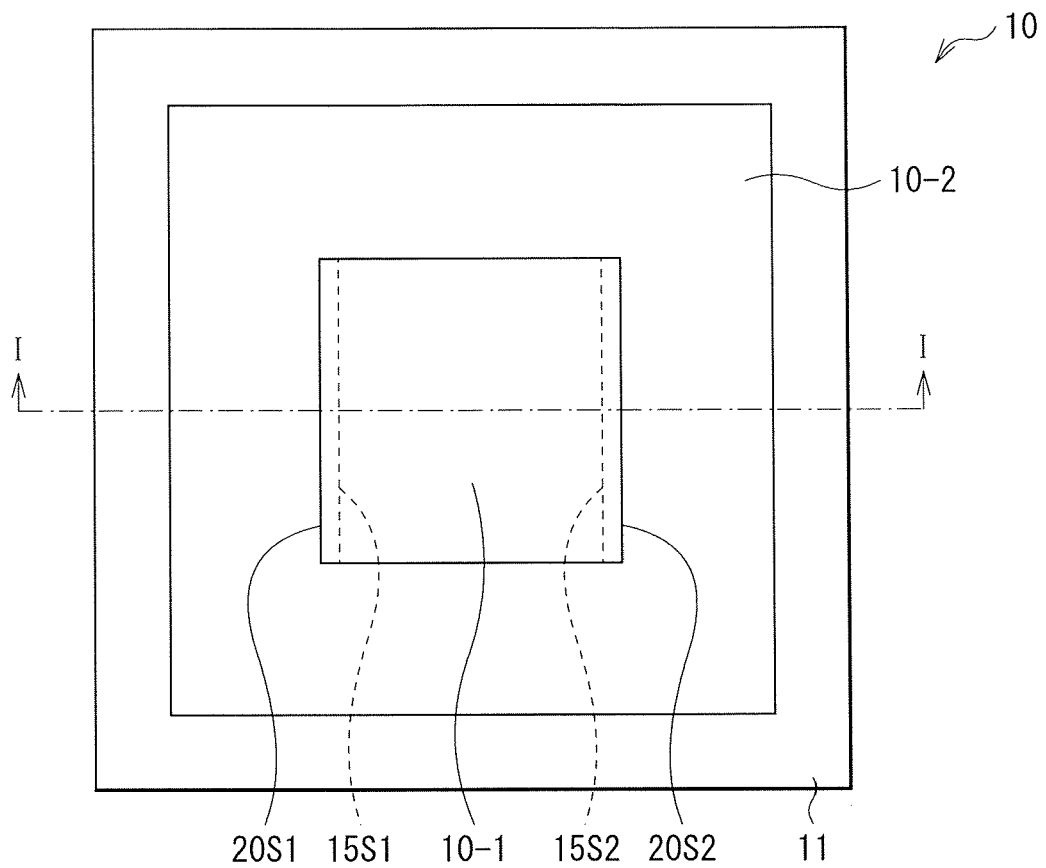
FIG. 2 is a plan view showing an exemplary overall configuration of the display unit shown in FIG. 1.

FIG. 1 is a cross-sectional view showing an exemplary configuration of a main section of a display unit (display unit 1) according to a first embodiment of the present disclosure. FIG. 2 is a plan view showing an exemplary overall configuration of the display unit 1. FIG. 1 corresponds to a cross-sectional view taken along a line I-I shown in FIG. 2 as viewed in a direction of its arrow.

The display unit 1 may serve as, for example, an electronic paper display, and has a structure in which a display layer 20, a counter substrate 30, a moisture-proof film 40, and an optical-functional film 50 are laminated on a driving substrate 10 (substrate) in this order. For example, a wiring layer 15 in the driving substrate 10, the display layer 20, the counter substrate 30, the moisture-proof film 40, and the optical-functional film 50 each have side surfaces covered with a sealing section 60. It should be noted that the structures of the display unit 1 and the like are schematically shown in the drawings accompanying the request of the present application, and accordingly may differ in dimensions and shape from the actual structures.

The driving substrate 10 has a substrate 11, a barrier layer 12, a TFT layer 13, and a planarizing layer 14 in this order, and the display layer 20 is provided on the planarizing layer 14. As shown in FIG. 2, the driving substrate 10 has a display region 10-1 in a central portion thereof, and a sealing region 10-2 that adjoins and surrounds the display region 10-1. The display layer 20 and the counter substrate 30 are provided in the display region 10-1, and the sealing section 60 is provided in the sealing region 10-2. A wiring part (not illustrated) through which an external signal is supplied is provided on the periphery of the driving substrate 10.

Examples of a material of the substrate 11 may include: an inorganic material such as glass, quartz, silicon, or gallium arsenide; and a plastic material such as polyimide, polyethylene terephthalate (PET), polyethylene naphthalate (PEN), polymethyl methacrylate (PMMA), polycarbonate (PC), polyether sulfone (PES), polyether ether ketone (PEEK), or aromatic polyester (liquid crystal polymer). The substrate 11 may be, for example, a flexible material such as a thin-layer glass or a film, and thereby realizes a flexible display.

The barrier layer 12 may be an $AlO_xN_{1-x}$ (X=0.01 to 0.2) film or a silicon nitride ($Si_3N_4$) film formed by, for example, a chemical vapor deposition (CVD) method. The barrier layer 12 prevents the TFT layer 13 and the display layer 20 from being deteriorated due to moisture or organic gas.

The TFT layer 13 has a switching function of selecting pixels. The TFT layer 13 may be configured either of an inorganic TFT that uses an inorganic semiconductor layer as a channel layer or an organic TFT that uses an organic semiconductor layer as a channel layer.

The planarizing layer 14 in the driving substrate 10 is disposed on a surface opposite from the display layer 20, namely, on the TFT layer 13, and reduces the unevenness which is developed due to the wires and the like. The planarizing layer 14 may be made of, for example, acrylic, polyimide, etc. Herein, both the TFT layer 13 and the planarizing layer 14 are collectively referred to as the wiring layer 15. It is to be noted that the TFT layer 13 may have a thickness in a range, for example, from about 1 μm to 5 μm, and the planarizing layer 14 may have a thickness in a range, for example, from about 1 μm to 10 μm. Accordingly, the wiring layer 15 may have a thickness 15T in a range, for example, from about 2 μm to 15 μm.

The sealing region 10-2 may be subjected to a surface treatment such as an oxygen plasma treatment, in order to enhance wettability of the sealing region 10-2. In that case, the wettability of the sealing region 10-2 with respect to resin configuring the sealing section 60 is improved, and the resin becomes easier to be spread on the sealing region 10-2.

The display layer 20 has a display body between pixel electrodes and a common electrode. The pixel electrodes are in contact with the planarizing layer 14, and the common electrode is in contact with the counter substrate 30. The display layer 20 may have a thickness in a range from, for example, about 40 μm to 165 μm in a lamination direction. The pixel electrode is provided for each pixel, and may be made of a simple substance of a metal element such as chromium (Cr), gold (Au), platinum (Pt), nickel (Ni), copper (Cu), tungsten (W), aluminum (Al), or silver (Ag), or an alloy containing one or more types of such metal. The common electrode is provided over a surface of the counter substrate 30, and may be made of, for example, a light-transmitting conducting material (transparent electrode material), such as indium-tin oxide (ITO), antimony-tin oxide (ATO), fluorine-doped tin oxide (FTO), or aluminum-doped zinc oxide (AZO).

The constituent material of the counter substrate 30 may be a material that transmits light out of materials similar to those of the substrate 10. A reason for this is that this embodiment employs a structure which allows an observer to visually recognize an image created by light that has passed through the counter substrate 30.

The moisture-proof film 40 prevents moisture from entering the display layer 20, and is disposed between the display layer 20 and the optical-functional film 50 at an outermost surface. The moisture-proof film 40 is bonded to the counter substrate 30 with, for example, pressure-sensitive or heat-sensitive adhesive, etc. The moisture-proof film 40 may be made of, for example, polyethylene terephthalate, polymethyl methacrylate, polycarbonate, polyethylene naphthalate, polypropylene, nylon-6, nylon-66, polyvinylidene chloride, or polyether sulfone. As for the moisture-proof property, the moisture-proof film 40 may have water-vapor permeability of, for example, 0.1 $g/m^2$/day to 0.000001 g/m²/day, preferably, 0.03 g/m²/day or less. In addition, the moisture-proof film 40 may preferably have high light transmission characteristics.

In the display unit 1, each of the moisture-proof film 40 and the optical-functional film 50 is larger in area than the display region 10-1 (the display layer 20 and the counter substrate 30), and has both ends that extend to the sealing region 10-2. As a result, a gap is created between the moisture-proof film 40 and the driving substrate 10, so that an eaves structure is formed.

The optical-functional film 50 prevents external light from being appearing on the display surface, for example, and is disposed to oppose the display surface of the display layer 20 with the moisture-proof film 40 therebetween. The optical-functional film 50 is bonded to the moisture-proof film 40 with adhesive (not illustrated) in between. Specifically, the optical-functional film 50 has an antireflection or anti-dazzle function. To give an example, if the optical-functional film 50 has an antireflection function, the optical-functional film 50 may be configured of, for example, a laminated body including a plurality of thin films having different refractive indices, and this laminated body attenuates reflected light by utilizing interfere of reflected light that occurs in the interface surfaces of the thin films. To give another example, if the optical-functional film 50 has an anti-dazzle function, a surface of the optical-functional film 50 has an uneven surface formed by coating, that diffuses external light thereon. Instead of the optical-functional film 50, a film such as a hard coat film that protects the display surface from physical stimulus (external force) may be formed as the surface film.

The sealing section 60 is provided on the barrier layer 12 so as to cover the respective end surfaces of the wiring layer 15, the display layer 20, the counter substrate 30, the moisture-proof film 40, and the optical-functional film 50. In other words, the sealing section 60 is provided so as to surround the respective circumferences of the wiring layer 15, the display layer 20, the counter substrate 30, the moisture-proof film 40, and the optical-functional film 50. Preferably, the constituent material of the sealing section 60 may be a material that is allowed to seal the end of the display unit 1 and to prevent moisture from entering the display unit 1 from its side. Examples of the constituent material of the sealing section 60 may include thermosetting or ultraviolet-curable acrylic-based resin, methacrylate-based resin, and epoxy resin.

In the display unit 1, the wiring layer 15 is provided in a region differing from positions corresponding to both end surfaces 20S1 and 20S2 of the display layer 20. In more detail, the wiring layer 15 has an end surface 15S1 at a position P2 that is recessed inwardly with respect to a position P1 of the end surface 20S1. Likewise, the wiring layer 15 has an end surface 15S2 at a position P4 that is recessed inwardly with respect to a position P3 of the end surface 20S2. Desirably, a distance L1 between the positions P1 and P2 may be greater than a thickness 15T of the wiring layer 15. Similarly, a distance L2 between the positions P3 and P4 may desirably be greater than the thickness 15T of the wiring layer 15.

(Method of Manufacturing Display Unit 1)

The display unit 1 may be manufactured, for example, through the following processes.

First, the base 11 made of the material above is prepared, and is bonded to a flat carrier glass G (described below) with, for example, a gluing agent. Subsequently, for example, silicon is set as a target, and the base 11 is subjected to high-frequency sputtering while nitrogen gas is being introduced. As a result of the sputtering, the barrier layer 12 made of silicon nitride is formed on the base 11. Subsequently, the TFT layer 13 and the planarizing layer 14 described above are laminated on the barrier layer 12 in this order, and are patterned so that the wiring layer 15 having a predetermined shape is formed. As a result, the driving substrate 10 is formed. The sealing region 10-2 of the driving substrate 10 (planarizing layer 14) may be subjected to an oxygen plasma treatment.

After the formation of the driving substrate 10, a metal film made of, for example, chromium, gold, platinum, nickel, copper, tungsten, or silver is formed throughout the surface of the driving substrate 10, and is patterned so that pixel electrodes are formed.

Then, a display body is formed in the counter substrate 30 provided with the common electrode through, for example, application. Subsequently, after the counter substrate 30 in which the display body has been formed is aligned with the driving substrate 10, the counter substrate 30 and the driving substrate 10 are bonded to each other. As a result, the display layer 20 and the counter substrate 30 are formed on the driving substrate 10. The common electrode is formed in advance, for example, by forming a film made of ITO throughout one surface of the counter substrate 30.

Figure 3:
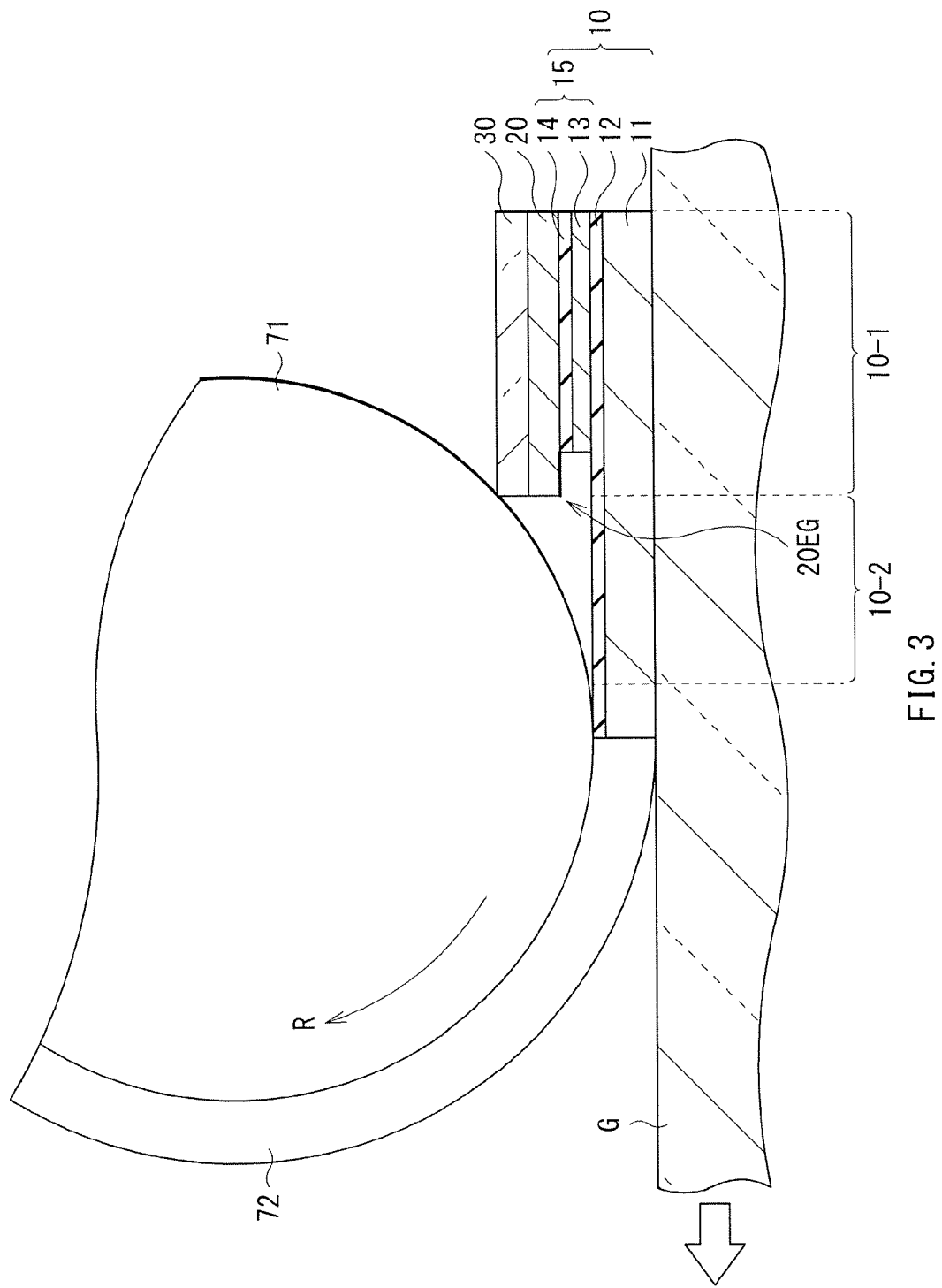
FIG. 3 is a cross-sectional view showing one process in a method of manufacturing the display unit shown in FIG. 1.

Subsequently, as shown in FIG. 3, for example, the laminated body including the driving substrate 10, the display layer 20, and the counter substrate 30 is delaminated from the carrier glass G described above with the use of a delamination roller 71. In more detail, a dummy film called a peel film 72 is adhered to an end of the base 11. Subsequently, part of the peel film 72 is wound around the delamination roller 71 and is fixed thereto. Thereafter, the carrier glass G is moved in a left direction in the paper plane in FIG. 3 with respect to the delamination roller 71 while the delamination roller 71 is being rotated in a direction of an arrow R. As a result, the base 11 is delaminated from the carrier glass G. In this case, desirably, the base 11 may be kept so as to undergo a fixed tension.

In this embodiment, the end surfaces 15S1 and 15S2 of the wiring layer 15 are recessed inwardly with respect to the end surfaces 20S1 and 20S2, respectively, of the display layer 20. Therefore, when the display layer 20 that has a relatively-higher hardness than the wiring layer 15 is reeled up by the delamination roller 71, the wiring layer 15 is not broken or damaged by an edge 20EG of the display layer 20. In particular, if the distances L1 and L2 are set greater than the thickness 15T of the wiring layer 15, the damage to the wiring layer 15 is avoided more reliably.

Figure 4:
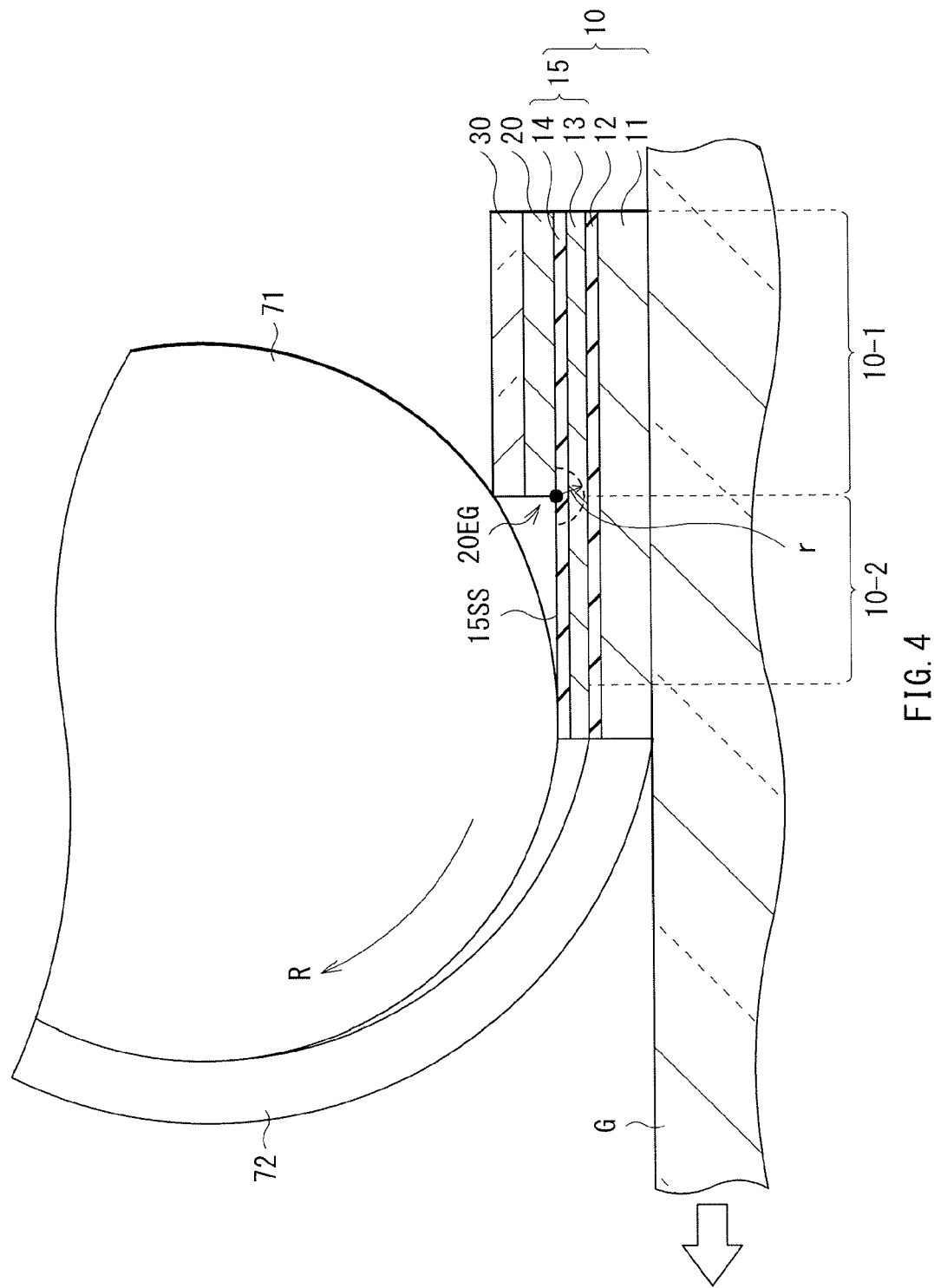
FIG. 4 is a cross-sectional view showing one process in a method of manufacturing a display unit of a comparative example.
Figure 5:
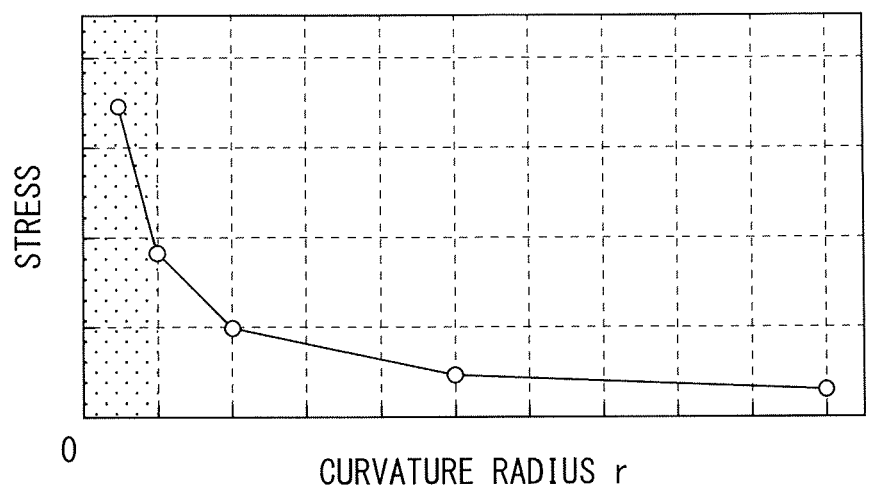
FIG. 5 is a characteristic diagram showing a relationship between stress applied to a wiring layer and a curvature radius, in the process in the method of manufacturing the display unit shown in FIG. 4.

In contrast, in the case where the wiring layer 15 extends from the display region 10-1 to the sealing region 10-2, for example, as in a comparative example shown in FIG. 4, the edge 20EG of the display layer 20 is pressed against the wiring layer 15 by the delamination roller 71. As a result, the wiring layer 15 may be broken or damaged, depending on the hardnesses of the display layer 20 and the wiring layer 15, or the thickness of the wiring layer 15. Stress applied to the wiring layer 15 during the delamination process varies depending on a curvature radius r centered on the edge 20EG of the display layer 20 which is in contact with a surface 15SS of the wiring layer 15. In more detail, as in a schematic graph in FIG. 5, for example, the stress applied to the wiring layer 15 increases as the curvature radius r decreases. Therefore, if the planarizing layer 14 has a sufficiently-large thickness, the influence on the thin film transistors and the wires in the TFT layer 13 is reduced, so that the wiring layer 15 would not be damaged. In this case, however, it may be difficult to decrease the thickness of the wiring layer 15. In this embodiment, employing the structure in which the edge 20EG is not in contact with the wiring layer 15 reduces a risk of damage to the wiring layer 15. Consequently, the wiring layer 15 is allowed to be made thinner.

After the laminated body including the driving substrate 10, the display layer 20, and the counter substrate 30 is delaminated from the carrier glass G, the moisture-proof film 40 is fixed onto the counter substrate 30 with transparent adhesive. In this case, all the sides of the moisture-proof film 40 used are longer than those of the display region 10-1, and an area of the moisture-proof film 40 is also larger than that of the display region 10-1. As a result, the moisture-proof film 40 partially protrudes outwardly from the display region 10-1, and therefore the eaves structure is formed. After the moisture-proof film 40 is fixed onto the counter substrate 30, the optical-functional film 50 is provided on the moisture-proof film 40. Alternatively, both the moisture-proof film 40 and the optical-functional film 50 may be bonded to the counter substrate 30 in advance, and then the counter substrate 30 may be disposed to oppose the driving substrate 10.

After the optical-functional film 50 is provided, the sealing section 60 is formed in the sealing region 10-2. Details of this process will be described below.

Figure 6:
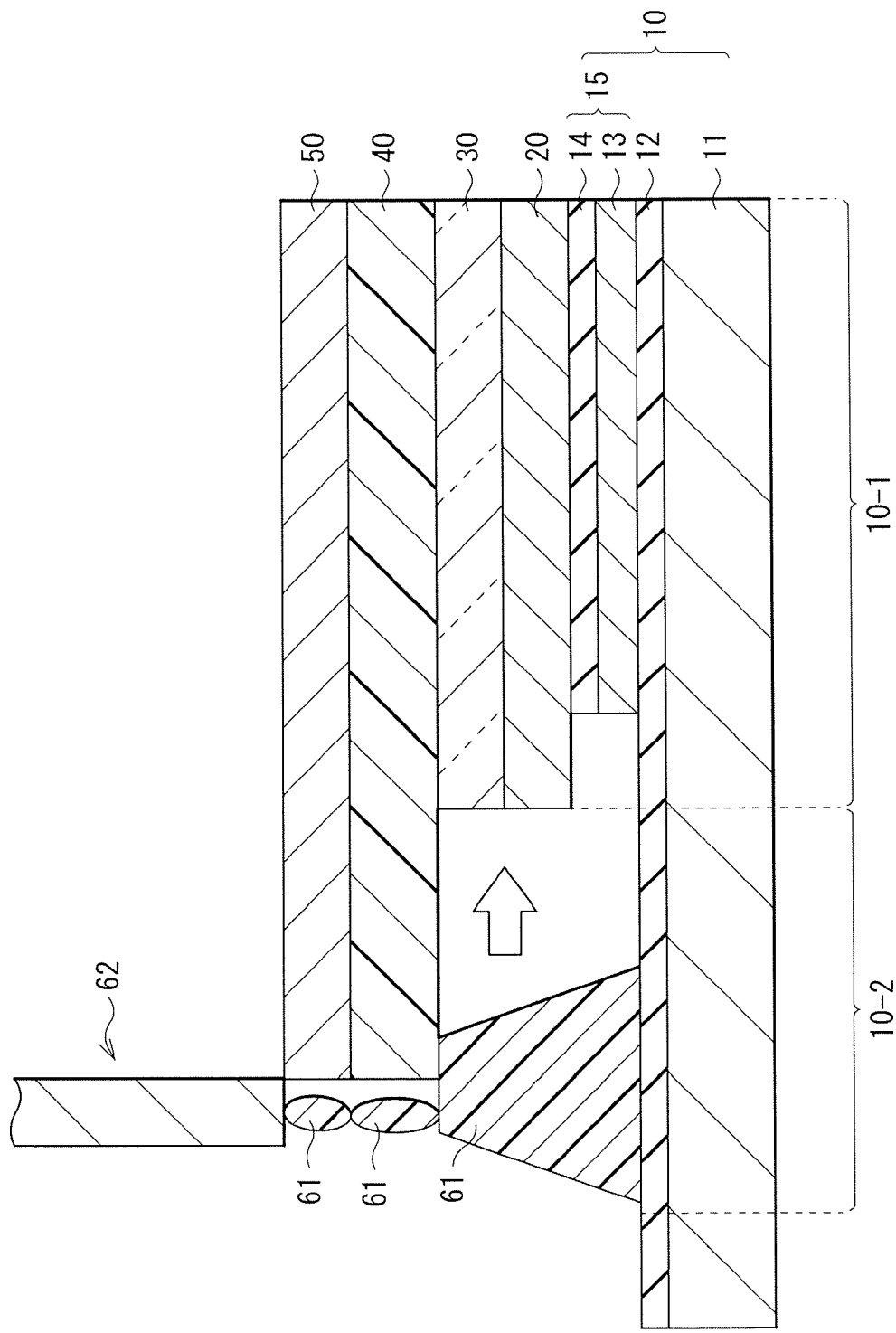
FIG. 6 is a cross-sectional view showing another process in the method of manufacturing the display unit shown in FIG. 1.

In forming the sealing section 60, as shown in FIG. 6, first, thermoset or ultraviolet-curable resin (pre-cured resin 61) is dropped, for example, from a needle 62 to a gap between the moisture-proof film 40 and the barrier layer 12 of the driving substrate 10. In this case, the pre-cured resin 61 may be considerably less viscous in some degree, because the pre-cured resin 61 is filled in the gap due to its capillarity. The viscosity of the pre-cured resin 61 may be set to, for example, 10 (Pa·s) or less, more preferably, 2 (Pa·s) or less. The viscosity of the uncured resin 61 may be adjusted using its resin components. Alternatively, by heating a syringe body (not illustrated) or the needle 62, the viscosity of the uncured resin 61 may be also decreased.

Figure 7:
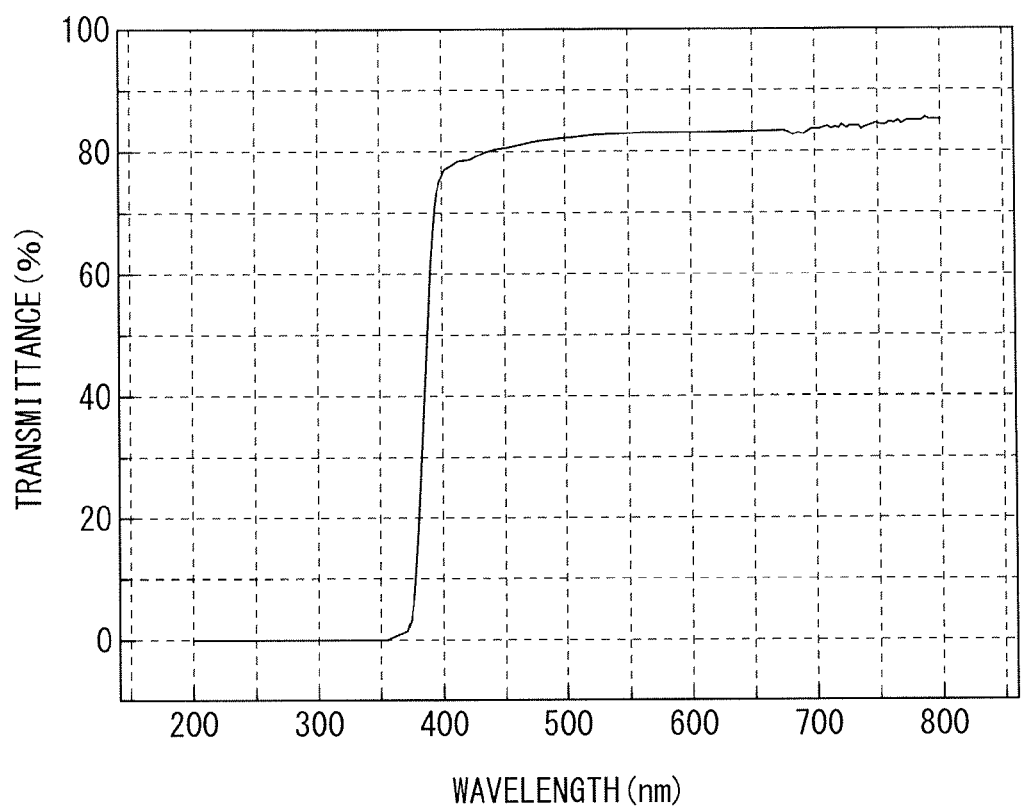
FIG. 7 is a diagram showing a relationship between a wavelength and transmittance of a film having an ultraviolet blocking function.

The pre-cured resin 61 is filled in the gap so as to make contact with the respective end surfaces of the wiring layer 15, the display layer 20, and the counter substrate 30. Thereafter, the pre-cured resin 61 is cured, for example, by the irradiation of heat or light, so that the sealing section 60 is formed. Many types of films that are applicable to the moisture-proof film 40 or the optical-functional film 50 have an ultraviolet blocking function. If a film of one of these types is applied to the moisture-proof film 40 or the optical-functional film 50, a resin material that is curable with light whose a wavelength falls outside the blocked ultraviolet wavelength range may be used to form the sealing section 60. FIG. 7 shows an exemplary relationship between a wavelength and light transmittance in the moisture-proof film 40 that has an ultraviolet blocking function. When the moisture-proof film 40 as shown in FIG. 7 is used, a resin material that is curable by irradiation of light (visible light) with a longer wavelength than 380 nm may be used for the sealing section 60. It is to be noted that, in order to maintain the flexibility of the display unit 1, the Young's modulus of the sealing section 60 (cured resin) may preferably be equal to or less than 500 (MPa), more preferably, be equal to or less than 100 (MPa). Through the processes above, the display unit 1 shown in FIG. 1 is completed.

(Functions and Effects of Display Units 1)

As described above, the display unit 1 in the first embodiment has the structure in which the end surfaces 15S1 and 15S2 of the wiring layer 15 are recessed inwardly with respect to the end surfaces 20S1 and 20S2, respectively, of the display layer 20. This structure prevents the edge 20EG of the display layer 20 from interfering with the wiring layer 115 during the manufacture. This allows the delamination process to be performed without causing the edge 20EG to damage the wiring layer 15. In other words, this makes it possible to reduce the occurrence factor in damaging the wiring layer 15 during the manufacture. It is consequently possible to achieve superior mass productivity, and to secure high reliability without impairing the functions even if the wiring layer 15 is made thinner.

Second Embodiment

Configuration of Display Unit 1A

Figure 8:
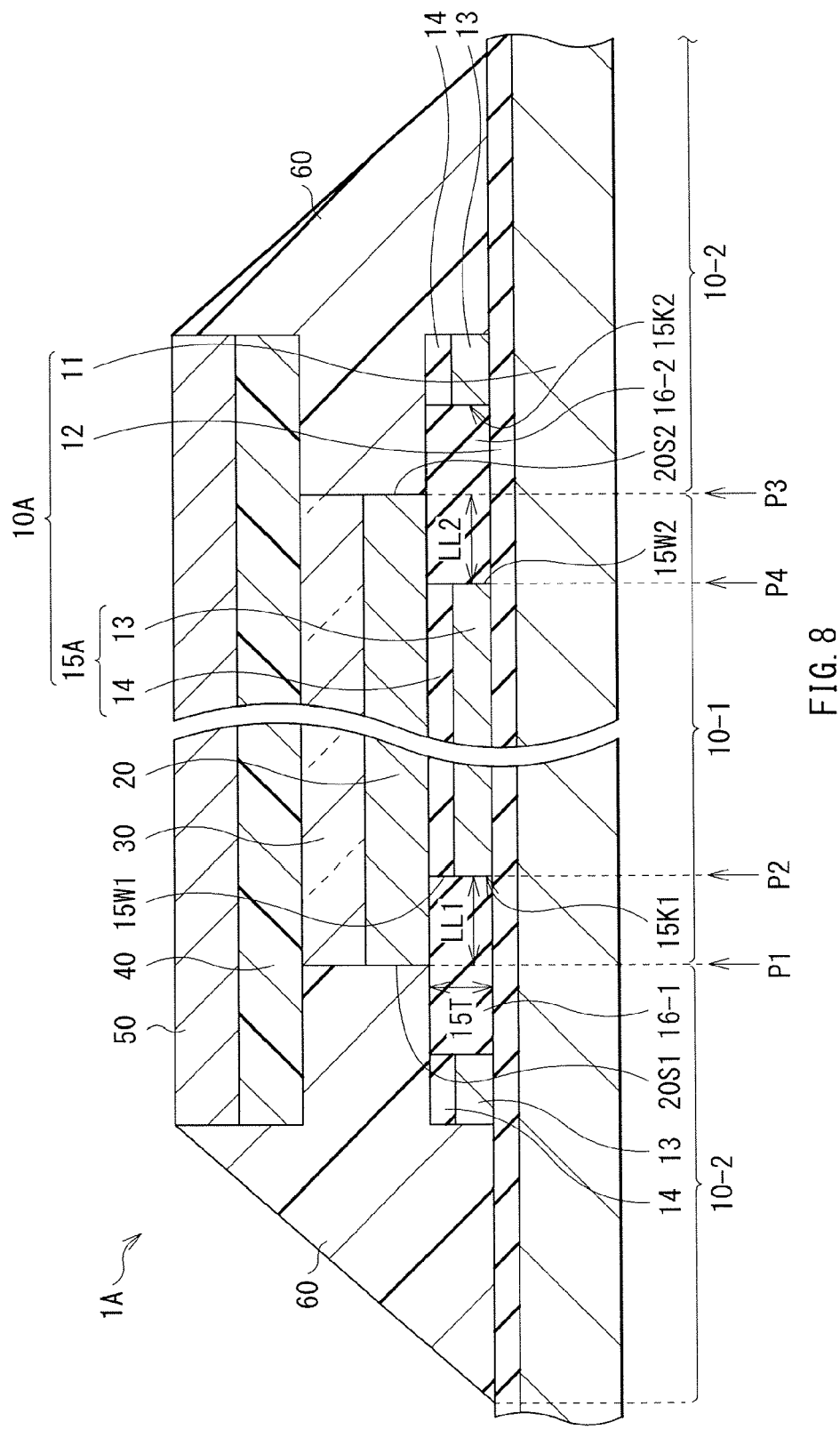
FIG. 8 is a cross-sectional view showing an exemplary configuration of a main section of a display unit according to a second embodiment of the present disclosure.
Figure 9:
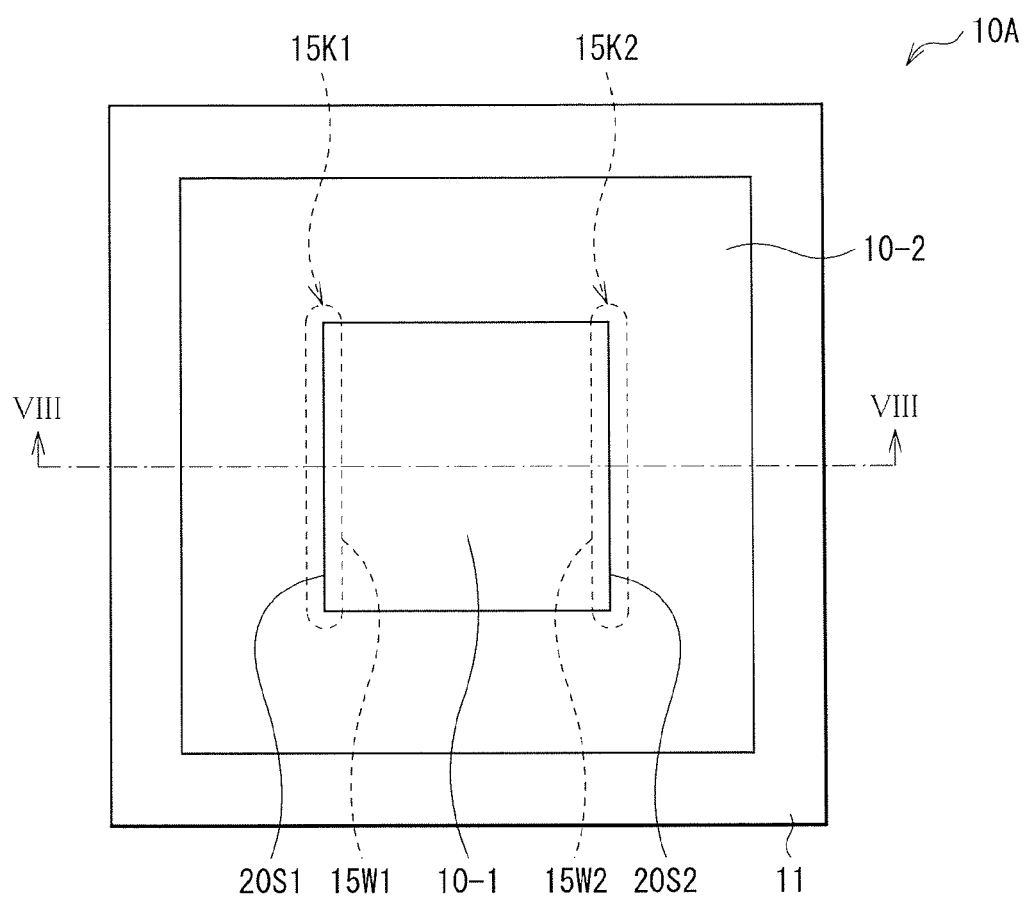
FIG. 9 is a plan view showing an exemplary overall configuration of the display unit shown in FIG. 8.

FIG. 8 is a cross-sectional view showing an exemplary configuration of a main section of a display unit (display unit 1A) according to a second embodiment of the present disclosure. FIG. 9 is a plan view showing an exemplary overall configuration of the display unit 1A. FIG. 8 corresponds to a cross-sectional view taken along a line VIII-VIII shown in FIG. 9 as viewed in a direction of its arrow.

The display unit 1A has a configuration similar to that of the display unit 1 except that the display unit 1A is provided with a driving substrate 10A. In the following description, accordingly, the same characters are assigned to components in the display unit 1A which are similar to those in the display unit 1, and these components will not be described as appropriate.

When the display unit 1A is compared with the display unit 1, the display unit 1A has a wiring layer 15A instead of the wiring layer 15. The wiring layer 15A has a laminated structure including the TFT layer 13 and the planarizing layer 14, similar to that of the wiring layer 15. In the display unit 1A, the wiring layer 15A is also provided in a region differing from positions corresponding to the end surfaces 20S1 and 20S2 of the displaying layer 20. Specifically, as shown in FIGS. 8 and 9, the wiring layer 15A has an opening 15K1 in a region corresponding to the end surface 20S1 of the displaying layer 20, and the opening 15K1 is filled with an intermediate layer 16-1. Likewise, the wiring layer 15A has an opening 15K2 in a region corresponding to the end surface 20S2 of the display layer 20, and the opening 15K2 is filled with an intermediate layer 16-2. The openings 15K1 and 15K2 may have wall surfaces 15W1 and 15W2 at positions away from those of the end surfaces 20S1 and 20S2, respectively. It is to be noted that the intermediate layers 16-1 and 16-2 may be made of, for example, the same type of material as that of the planarizing layer 14.

(Functions and Effects of Display Unit 1A)

As described above, the display unit 1A in the second embodiment has the structure in which the openings 15K1 and 15K2 are provided in regions, of the wiring layer 15A, that correspond to the end surfaces 20S1 and 20S2 of the displaying layer 20, respectively, and the openings 15K1 and 15K2 are filled with the intermediate layers 16-1 and 16-2, respectively. This allows the delamination process to be performed without causing the edge 20EG of the displaying layer 20 to damage the wiring layer 15A during the manufacture, in a manner similar to that of the display unit 1. In other words, this makes it possible to reduce the occurrence factor in damaging the wiring layer 15A during the manufacture. It is consequently possible to achieve superior mass productivity, and to secure high reliability without impairing the functions even if the wiring layer 15 is made thinner. In particular, if a distance LL1 between the respective positions of the wall surface 15W1 of the opening 15K1 and the end surface 20S1 is larger than a thickness TT of the wiring layer 15A, and a distance LL2 between the respective positions of the wall surface 15W2 of the opening 15K2 and the end surface 20S2 is also larger than the thickness TT of the wiring layer 15A, the damage to the wiring layer 15 is prevented more reliably.

[Modification of Display Unit 1A]

Figure 10:
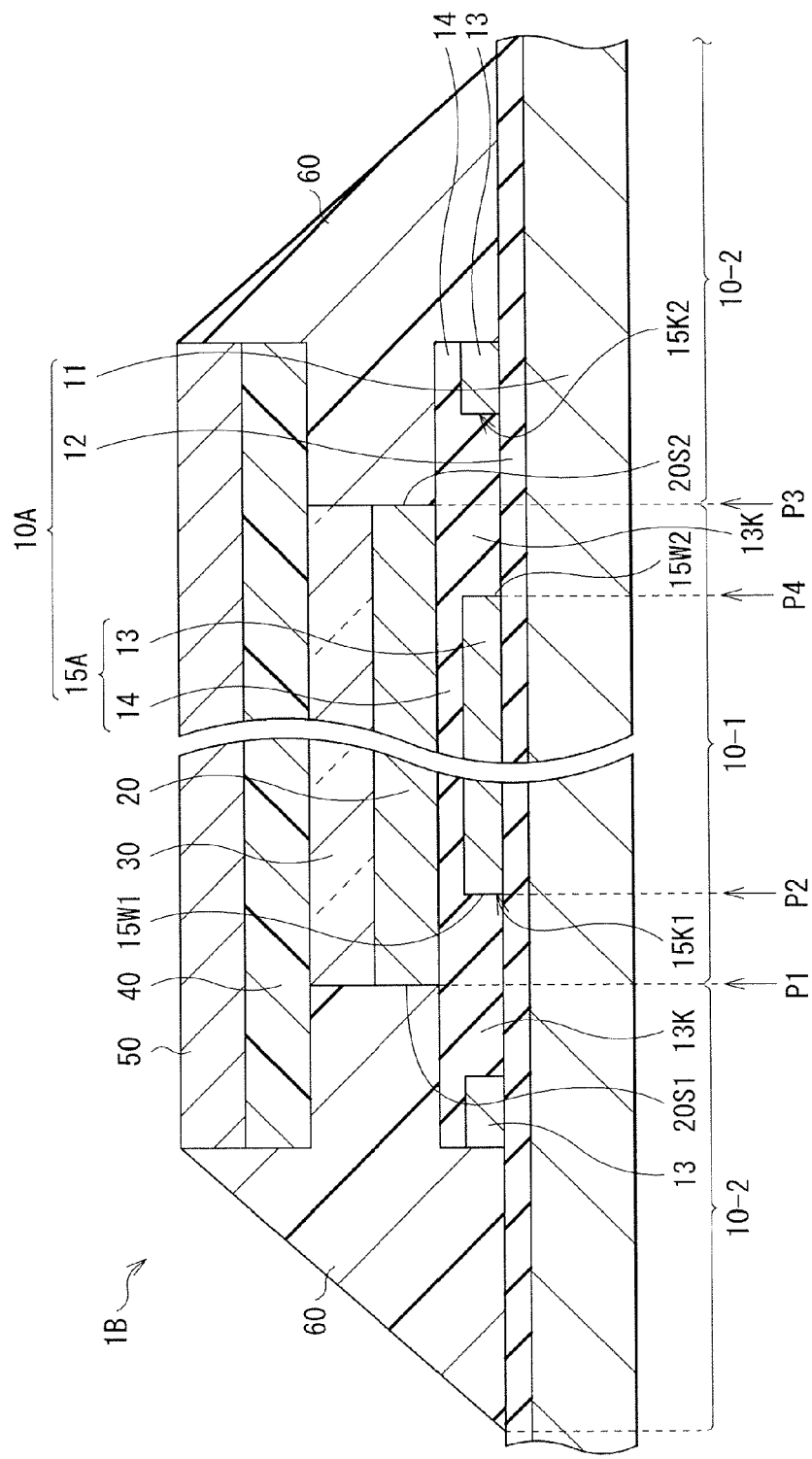
FIG. 10 is a cross-sectional view showing a modification of the display unit shown in FIG. 8.

FIG. 10 is a cross-sectional view showing a display unit 1B as a modification of the display unit 1A shown in FIGS. 8 and 9. In this modification, both a wiring layer and an intermediate layer are integrated. In more detail, the TFT layer 13 has an opening 13K, which is filled with the planarizing layer 14 that entirely covers the TFT layer 13. In other words, part of the planarizing layer 14 is replaced by the intermediate layer 16 (16-1 and 16-2) in the display unit 1A described above. The display unit 1B configured above also produces an effect similar to that in the display unit 1A.

Exemplary Applications

A description will be given below of exemplary applications of a display unit as described above (display unit 1, 1A, or 1B) to an electronic apparatus. Examples of the electronic apparatus may include a television apparatus, a digital camera, a notebook personal computer, a portable-terminal apparatus such as a portable phone, a video camera. In other words, the display unit described above is applicable to electronic apparatuses in any field that display an image signal externally received or internally generated as a still or moving image.

Exemplary Application 1

Figure 11A:
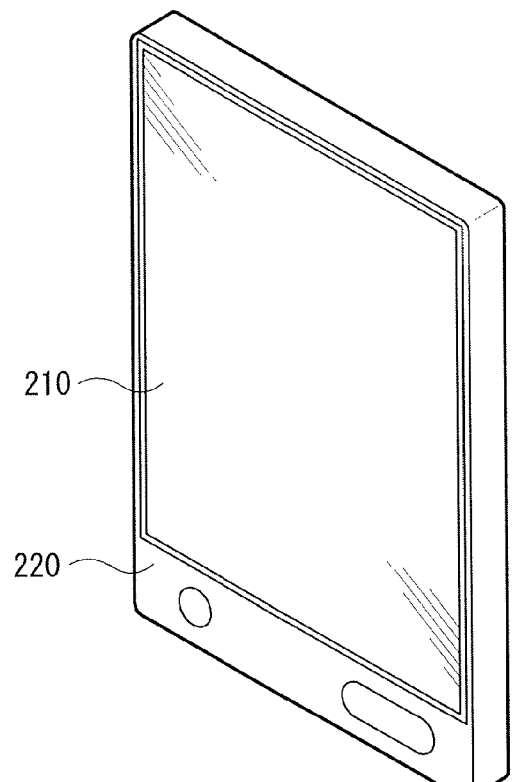
FIG. 11A is a perspective view showing an appearance of Exemplary application 1 of the display unit shown in FIGS. 1 and 2.
Figure 11B:
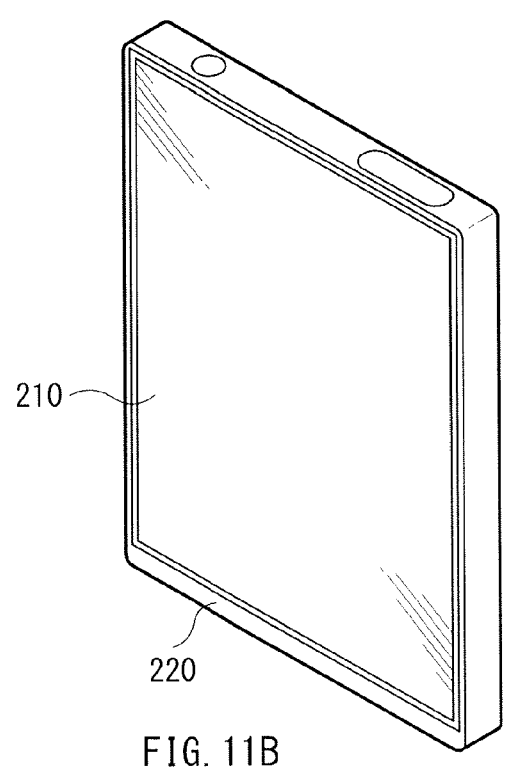
FIG. 11B is another perspective view showing the appearance of Exemplary application 1.

FIGS. 11A and 11B show an appearance of an electronic book that employs the display unit in any one of the above-described first and second embodiments and the modification. Exemplary components of this electronic book may be a display section 210 and a non-display section 220, and the display section 210 is configured of the display unit in any one of the above-described first and second embodiments and the modification.

Exemplary Application 2

Figure 12:
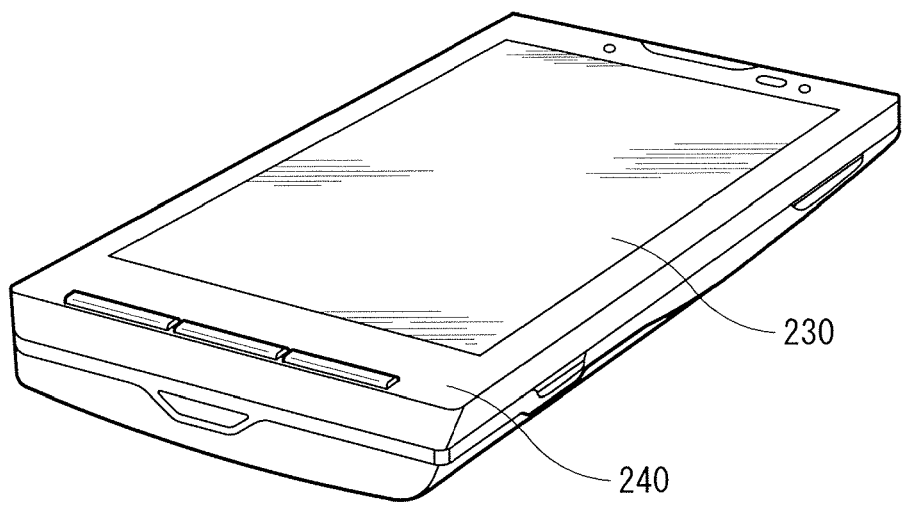
FIG. 12 is a perspective view showing an appearance of Exemplary application 2.

FIG. 12 shows an appearance of a smart phone that employs the display unit in any one of the above-described first and second embodiments and the modification. Exemplary components of this smart phone may be a display section 230 and a non-display section 240, and the display section 230 is configured of the display unit in any one of the above-described first and second embodiments and the modification.

Exemplary Application 3

Figure 13:
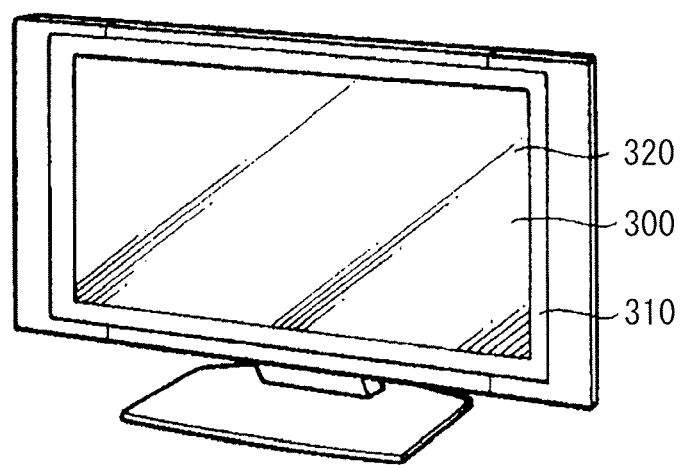
FIG. 13 is a perspective view showing an appearance of Exemplary application 3.

FIG. 13 shows an appearance of a television apparatus that employs the display in any one of the above-described first and second embodiments and the modification. Exemplary components of this television apparatus may be an image display screen section 300 including a front panel 310 and a filter glass 320, and the image display screen section 300 is configured of the display in any one of the above-described first and second embodiments and the modification.

Exemplary Application 4

Figure 14A:
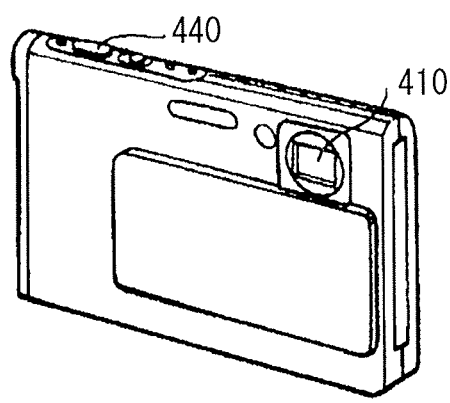
FIG. 14A is a perspective view showing an appearance of Exemplary application 4 as viewed from the front.
Figure 14B:
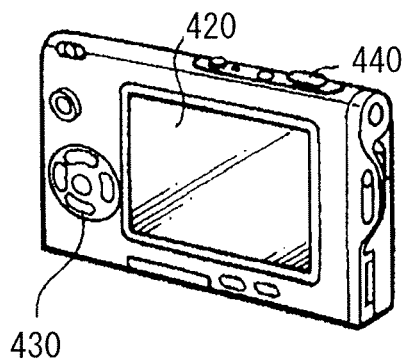
FIG. 14B is a perspective view showing the appearance of Exemplary application 4 as viewed from the rear.

FIGS. 14A and 14B show an appearance of a digital camera that employs the display unit in any one of the above-described first and second embodiments and the modification. Exemplary components of this digital camera may be a light-emitting section 410 for an flash, a display section 420, a menu switch 430, and a shutter button 440, and the display section 420 is configured of the display unit in any one of the above-described first and second embodiments and the modification.

Exemplary Application 5

Figure 15:
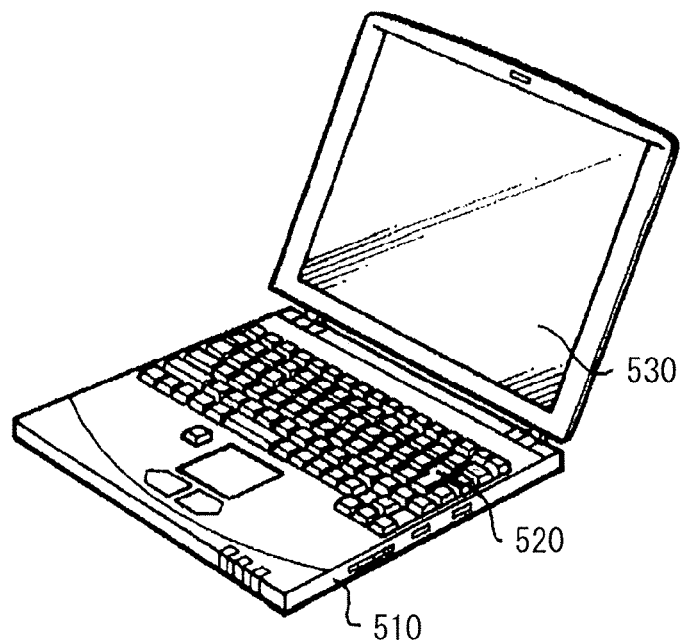
FIG. 15 is a perspective view showing an appearance of Exemplary application 5.

FIG. 15 shows an appearance of a notebook personal computer that employs the display unit in any one of the above-described first and second embodiments and the modification. Exemplary components of this notebook personal computer may be a main body 510, a keyboard 520 with which operations of inputting characters, letters, and the like are performed, and a display section 530 in which an image is displayed. The display section 530 is configured of the display in any one of the above-described first and second embodiments and the modification.

Exemplary Application 6

Figure 16:
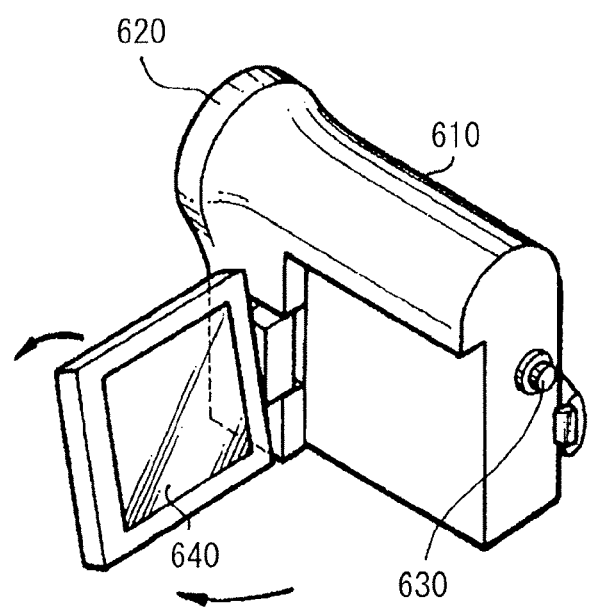
FIG. 16 is a perspective view showing an appearance of Exemplary application 6.

FIG. 16 shows an appearance of a video camera that employs the display unit in any one of the above-described first and second embodiments and the modification. Exemplary components of this video camera are a main body section 610, a lens 620 that is used to photograph a subject and is provided on the front side of the main body section 610, a start/stop switch 630 that is used to start or stop a photographing operation, and a display section 640. The display section 640 is configured of the display unit in any one of the above-described first and second embodiments and the modification.

Exemplary Application 7

Figure 17A:
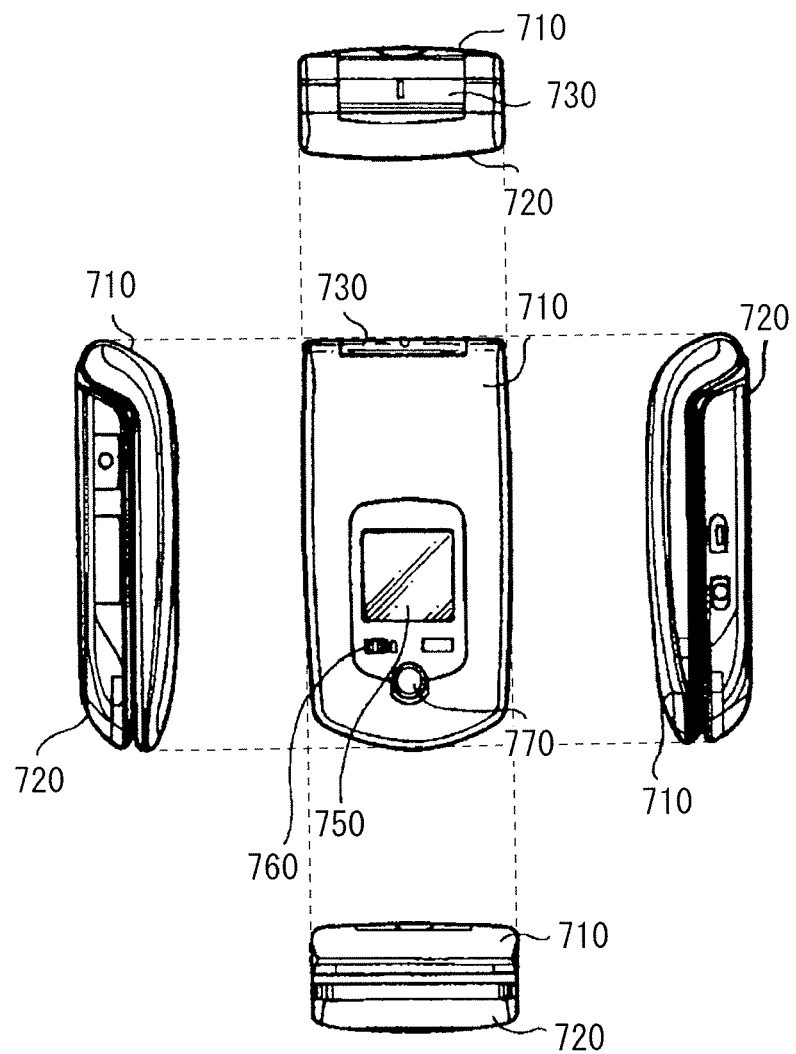
FIG. 17A is a view showing Exemplary application 7 in a closed state.
Figure 17B:
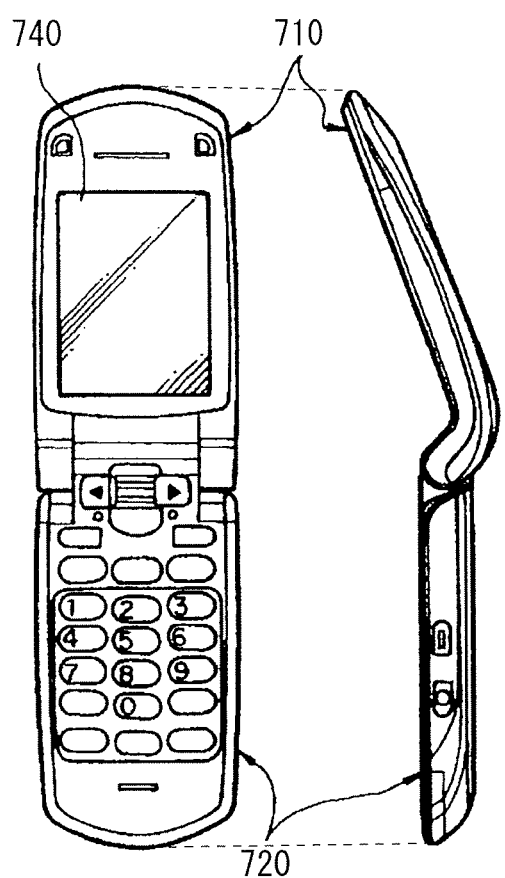
FIG. 17B is a view showing Exemplary application 7 in an opened state.

FIGS. 17A and 17B show an appearance of a portable phone that employs the display unit in any one of the above-described first and second embodiments and the modification. This portable phone may have an exemplary structure in which an upper housing 710 and a lower housing 720 are joined together by a joint section (hinge section) 730. Exemplary components of the portable phone may be a display 740, a sub-display 750, a picture light 760, and a camera 770. Among them, one or both of the display 740 and the sub-display 750 are configured of the display unit in any one of the above-described first and second embodiments and the modification.

Up to this point, the present technology has been described using the first and second embodiments and the modification; however, the present technology is not limited to these embodiments and the like, and various modifications are possible. For example, in the foregoing first embodiment, the end surfaces 15S1 and 15S2 of the wiring layer 15 are recessed with respect to the end surfaces 20S1 and 20S2 of the display layer 20, respectively. However, a structure in which either one is recessed, more specifically, either of a structure in which the end surface 15S1 is recessed with respect to the end surface 20S1 or a structure in which the end surface 15S2 is recessed with respect to the end surface 20S2 may be employed. Likewise, in the foregoing second embodiment, the openings 15K1 and 15K2 are provided in regions corresponding to the end surfaces 20S1 and 20S2 of the displaying layer 20, respectively. However, a structure in which either one of the openings 15K1 and 15K2 are provided may be employed. Alternatively, all the end surfaces on the four sides of the wiring layer may be recessed with respect to those of the display layer.

The embodiments and the like have been described regarding the case where the display unit serves as an electronic paper display; however, the display unit may serve as a liquid crystal display unit, an organic electroluminescence (EL) display unit, or an inorganic EL display unit.

Moreover, the material and thickness of each layer, the method and condition of forming each film, and the like, all of which have been described in the foregoing embodiments and the like, are not restrictive, and other material, thickness, method and/or condition may be employed.

In the foregoing embodiments and the like, the specific configurations of the display units 1, 1A, and 1B have been described; however, the display unit in an embodiment of the present technology is not limited to that including all the components shown in the drawings. Furthermore, some of the components may be replaced by other components.

Note that an embodiment of the present technology may also include the following configuration.

(1) A display unit including:
 a base;
 a display layer having a first end surface; and
 a wiring layer disposed between the base and the display layer, the wiring layer being provided in a region differing from a position corresponding to the first end surface.
(2) The display unit according to (1), wherein the wiring layer has a second end surface at a position recessed with respect to a position of the first end surface.
(3) The display unit according to (2), wherein
 a distance between the position of the first end surface and the position of the second end surface is greater than a thickness of the wiring layer.
(4) The display unit according to (2) or (3), wherein
 the display layer has a third end surface on an opposite side from the first end surface, and
 the wiring layer has a fourth end surface on an opposite side from the second end surface, the fourth end surface being provided at a position recessed with respect to a position of the third end surface.
(5) The display unit according to (3), wherein a distance between the position of the third end surface and a position of the fourth end surface is greater than the thickness of the wiring layer.
(6) The display unit according to (1), wherein
 the wiring layer has an opening in a region corresponding to the first end surface, and
 the opening is filled with an intermediate layer.
(7) The display unit according to (6), wherein the wiring layer and the intermediate layer are integrated.
(8) The display unit according to (6) or (7), wherein
 the opening has a wall surface at a position away from a position of the first end surface, and
 a distance between the position of the first end surface and the position of the wall surface is greater than a thickness of the wiring layer.
(9) An electronic apparatus with a display unit, the display unit including:
 a base;
 a display layer having a first end surface; and
 a wiring layer disposed between the base and the display layer, the wiring layer being provided in a region differing from a position corresponding to the first end surface.
(10) The electronic apparatus according to (9), wherein the wiring layer has a second end surface at a position recessed with respect to a position of the first end surface.

It should be understood by those skilled in the art that various modifications, combinations, sub-combinations and alterations may occur depending on design requirements and other factors insofar as they are within the scope of the appended claims or the equivalents thereof.

What is claimed is:
1. A display unit comprising:
 a laminated structure including:
  a substrate layer;
  a display layer having a first end surface; and
  a wiring layer disposed between the substrate layer and the display layer, the wiring layer being provided in a region differing from a position corresponding to the first end surface.
2. The display unit according to claim 1, wherein the wiring layer has a second end surface at a position recessed with respect to a position of the first end surface.
3. The display unit according to claim 2, wherein
 a distance between the position of the first end surface and the position of the second end surface is greater than a thickness of the wiring layer.
4. The display unit according to claim 2, wherein
 the display layer has a third end surface on an opposite side from the first end surface, and
 the wiring layer has a fourth end surface on an opposite side from the second end surface, the fourth end surface being provided at a position recessed with respect to a position of the third end surface.
5. The display unit according to claim 4, wherein a distance between the position of the third end surface and a position of the fourth end surface is greater than the thickness of the wiring layer.
6. The display unit according to claim 1, wherein
 the wiring layer has an opening in a region corresponding to the first end surface, and
 the opening is filled with an intermediate layer.
7. The display unit according to claim 6, wherein the wiring layer and the intermediate layer are integrated.
8. The display unit according to claim 6, wherein
 the opening has a wall surface at a position away from a position of the first end surface, and
 a distance between the position of the first end surface and the position of the wall surface is greater than a thickness of the wiring layer.
9. The display unit according to claim 1, wherein
 the laminated structure further includes a barrier layer disposed between the substrate layer and the wiring layer.
10. An electronic apparatus with a display unit, the display unit comprising:
 a laminated structure including:
  a substrate layer;
  a display layer having a first end surface; and
  a wiring layer disposed between the substrate layer and the display layer, the wiring layer being provided in a region differing from a position corresponding to the first end surface.
11. The electronic apparatus according to claim 10, wherein the wiring layer has a second end surface at a position recessed with respect to a position of the first end surface.
12. The electronic apparatus according to claim 10, wherein the laminated structure further includes a barrier layer disposed between the substrate layer and the wiring layer.

* * * * *